United States Patent [19]

Payne

[11] Patent Number: 4,909,718

[45] Date of Patent: Mar. 20, 1990

[54] STRUCTURAL UNIT, ASSEMBLY AND APPARATUS FOR MOLDING SAME

[76] Inventor: Le Roy Payne, 3300 Nicholas La., Molt, Mont. 59057

[21] Appl. No.: 271,717

[22] Filed: Nov. 16, 1988

Related U.S. Application Data

[60] Continuation-in-part of Ser. No. 202,267, Jun. 6, 1988, which is a continuation-in-part of Ser. No. 890,742, Jul. 30, 1986, Pat. No. 4,749,533, which is a division of Ser. No. 766,498, Aug. 19, 1985, Pat. No. 4,671,753.

[51] Int. Cl.$^4$ .......................... B29C 33/40; B32B 5/20
[52] U.S. Cl. ...................................... 425/145; 52/309.9;
52/589; 425/4 R; 425/150; 425/434; 425/435;
425/817 R; 428/33; 428/53; 428/318.8;
428/319.3
[58] Field of Search ............... 425/4 R, 145, 434, 435,
425/817 R, 150, DIG. 241; 264/45.5, 46.7, 311,
349, 40.7, DIG. 14, DIG. 17; 249/99, 101;
428/318.8, 310.5, 318.6, 314.2, 33, 53, 319.3;
52/588, 785, 805, 811, 589, 309.8, 309.9

[56] References Cited

U.S. PATENT DOCUMENTS

| | | | |
|---|---|---|---|
| 2,142,305 | 1/1939 | Davis | 52/589 |
| 2,181,451 | 11/1939 | Dow | 52/589 |
| 3,679,337 | 7/1972 | Fuselier | 425/435 X |
| 3,922,429 | 11/1975 | Welch et al. | 428/318.8 X |
| 4,043,721 | 8/1977 | Lemelson | 425/4 R X |
| 4,057,607 | 11/1977 | Soehngen et al. | 264/349 X |
| 4,154,785 | 5/1979 | Inui et al. | 264/45.5 |
| 4,285,903 | 8/1981 | Lemelson | 264/45.7 X |
| 4,389,177 | 6/1983 | Colby | 425/435 X |
| 4,560,335 | 12/1985 | Cordova et al. | 425/435 X |
| 4,575,981 | 3/1986 | Porter | 52/309.9 |

Primary Examiner—Richard L. Chiesa
Attorney, Agent, or Firm—Arthur L. Urban

[57] ABSTRACT

An insulated molded plastic structural unit includes spaced face portions, an intermediate portion and interlocking portions. The face portions each include an integrally formed stressed hard outer skin section and the intermediate portion includes an insulating core section. The interlocking portions include mateable sections along at least two edges of each unit, each mateable section including at least five alternating raised and recessed areas forming an asymmetrical pattern along the length thereof. The pattern is the same or a reverse thereof along each mateable section of the same unit and of adjacent units to which it will be joined. Particular mateable sections either extend beyond the face portions or are recessed below the face portions a substantially equal distance. Continuous molding apparatus includes a raw material supplying portion, a mixing portion, a molding portion and a control portion. The molding portion includes at least one rotatable mold assembly with at least two separable mold sections. At least one mold section includes a plurality of rotatable mold surface elements with each having a plurality of different mold surface segments.

32 Claims, 1 Drawing Sheet

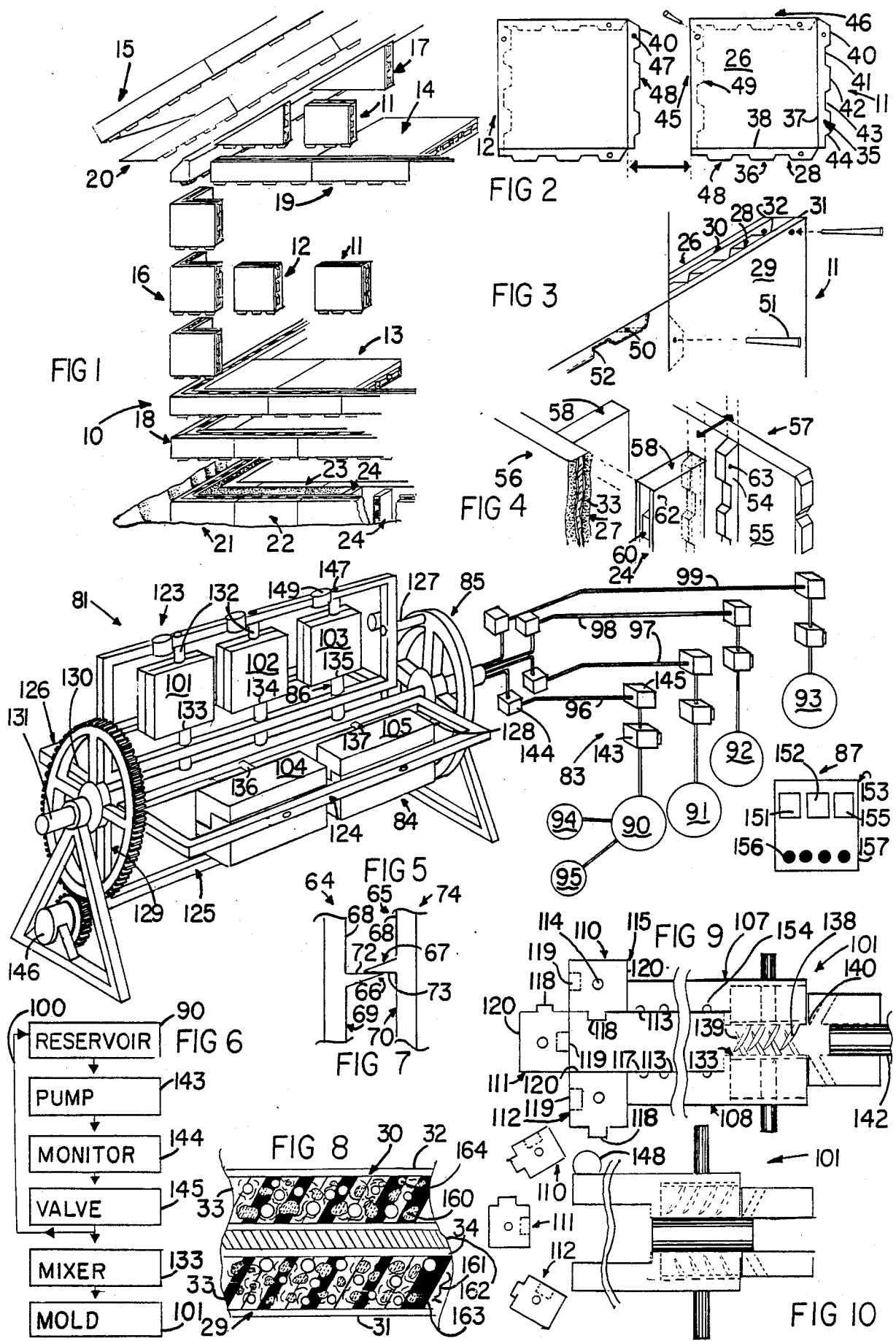

STRUCTURAL UNIT, ASSEMBLY AND APPARATUS FOR MOLDING SAME

This application is a continuation-in-part of pending application Ser. No. 202,267, filed June 6, 1988, which in turn is a continuation-in-part of application Ser. No. 890,742, filed July 30, 1986, now U.S. Pat. No. 4,749,533, which is a division of application Ser. No. 766,498, filed August 19, 1985, now U.S. Pat. No. 4,671,753.

This invention relates to a novel molded product and to a new molding apparatus for producing same.

Throughout history, an important activity has been the construction of buildings for various purposes such as dwellings, storage and the like. With primitive societies, it was common to construct such buildings from natural materials that were readily available. In forested areas, structures were erected with logs or boards that had been cut from the logs.

Where trees were less common, people used stone for building materials or artificial adobe substitutes formed from mud baked in the sun. To make artificial stones or bricks more durable and less likely to crumble, it was customary to mix straw or similar materials with the mud. The building components ordinarily were fabricated and/or prepared at the building site.

Even today, most building construction is performed at the building site using components and materials trucked to the site from other locations. Little fabrication is done away from the site at sawmills, brickyards, etc. and only a few special components such as windows are assembled in advance.

Conventional building methods require that a large number of different craftsmen do their work at the construction site. Thus, the quality of the finished building depends upon the ability of the craftsmen to perform their tasks properly under the conditions and distractions generated by the activities of the many other workmen on the site at the same time.

Efforts have been directed to the use of prefabricated modules produced at central locations and trucked to the building site for assembly. However, this type of construction has gained only limited acceptance because of the lack of flexibility in building designs, the module size limitations and the high cost of transporting modules over the highways.

To overcome the shortcomings of traditional construction procedures, the renowned architect, Frank Lloyd Wright and his associates, more than a half century ago, pioneered Usonian block houses fabricated with cast hollow concrete blocks. The blocks are formed with grooves around their edges so they can be interconnected with mortar and steel reinforcing bars like giant children's building blocks. The interconnected blocks can be used to span openings, contain utility services, accommodate glass, doors, and the like. This building system enables an owner and/or a small crew to construct a high quality building without an army of special craftsmen such as masons, carpenters, et.

The blocks can be fabricated at the building site in simple molds. The block system is based on modular units generally two to four feet in width. Great care must be exercised in the assembly of the blocks to ensure that the joints follow the module dimensions. Any cumulative incremental error eventually may disrupt the modular structure. Thus, the dimensions of the individual blocks have to be maintained within very close tolerances which is difficult to achieve with the inherent shrinkage that occurs during the molding of the blocks and the curing thereof with time.

From a practical viewpoint, the collection of a sufficiently large number of blocks of exactly the same dimensions for an entire building including the roof, floors and partitions is a formidable task. One must be willing to make a much larger number of blocks than needed and then inspect each carefully, discarding the many blocks that do not meet specifications.

Even when tolerable dimensional reproducability is achieved, the high strength and structural uniformity required for building quality, durability and integrity still must be attained.

In view of the above discussion, it is clear that previous building methods and procedures do not provide the design possibilities and construction efficiencies required currently and in the future. Thus, there is a need for a new structural unit and assembly procedure that overcome the shortcomings of earlier techniques.

The present invention provides a novel structural unit and assembly procedure that not only overcome the deficiencies of previous expedients but also provide features and advantages not found in such earlier endeavors. The structural unit of the invention has a high level of strength and other physical properties as well as uniformity and quality of structure. Also, the structural unit meets dimensional and structural specifications easily.

The molding method and apparatus of the present invention provide continuous high volume production of structural units of the invention with a minimum of rejects. The method and apparatus of the invention can be used efficiently by individuals and/or a small work crew after a short period of instruction.

The molding apparatus of the invention is simple in design and can be produced relatively inexpensively. Commercially available materials and components can be utilized for the molding apparatus. Conventional metal fabricating techniques can be employed to manufacture the apparatus. The apparatus is durable in construction and has a long useful life with a minimum of maintenance.

The molding apparatus can be modified to mold a wide variety of different structural units of the invention. Thus, foundation units, wall units, corner units, floor units, ceiling units, roof units, beam units and the like can be molded successfully with the method and apparatus of the invention.

Variations in configuration, structure and composition can be attained simply and quickly with the apparatus of the invention. Even with such variations, uniformity of dimensions, composition and quality can be maintained without difficulty.

Structural units of the present invention can be assembled to form buildings of many different designs easily and conveniently. The structural units can be assembled and locked together without special skills and tools by one or a few persons. The novel interlocking means and the dimensional uniformity of the structural units enables them to be assembled in modules precisely without mortar and without continuous checking of alignment and orientation as each unit is added.

Subsequent modification or alteration can be made to the building if desired. The building also can be dismantled and reconstructed at a different site.

These and other benefits and advantages of the novel structural unit, assembly method and molding apparatus for producing same of the present invention will be apparent from the following description and the accompanying drawings in which:

BRIEF DESCRIPTION OF THE DRAWINGS

FIG. 1 is a fragmentary view in perspective of a building constructed with one form of structural units of the invention with units separated;

FIG. 2 is an enlarged side view of two structural wall units shown in FIG. 1 prior to assembly;

FIG. 3 is a view in perspective of the wall units shown in FIG. 2 after assembly;

FIG. 4 is an enlarged view in perspective of a double wall unit assembly shown in FIG. 1 with parts separated;

FIG. 5 is a view in perspective of one form of molding apparatus of the invention;

FIG. 6 is a schematic illustration of one form of control portion of the molding apparatus of the invention;

FIG. 7 is a top view of another form of double wall unit assembly of the invention;

FIG. 8 is an enlarged fragmentary cross-sectional view of a structural unit of the invention shown in FIG. 2;

FIG. 9 is an enlarged fragmentary side view of a mold assembly of the molding apparatus shown in FIG. 5; and FIG. 10 is a fragmentary side view of the mold assembly shown in FIG. 9 during a subsequent step of the molding of a structural unit of the invention.

DETAIL DESCRIPTION OF THE DRAWINGS

As shown in the drawings, a building 10 is constructed with a plurality of insulated molded plastic structural units 11-24. Structural unit 11 is shown as a wall unit. Other units of similar flat configuration are shown as floor unit 13, ceiling unit 14 and roof unit 15. Corner units 16 also are similar to two wall units disposed at a right angle and are integrally formed as a unitary structure. In the eaves of the building, assemblies of wall units 11 and triangle units 17 are employed.

Peripheral components disposed between the foundation and floor and the sidewalls and eaves are formed from assemblies of beam units 18 and 19 respectively. The roof units 15 are supported on spaced rafter assemblies of beam units 20. Foundation units 21 may be constructed from double unit assemblies formed from spaced parallel units 22 and 23 which are joined together by connecting units 24.

Each of the structural units 11-24 includes spaced face portions 26, an intermediate portion 27 and interlocking portions 28. The face portions 26 e.g. faces 29 and 30 of wall unit 11, each include an integrally formed hard outer skin section 31 or 32. The intermediate portion 27 includes an insulating core section 33.

The interlocking portions 28 include mateable sections 35 and 36 along at least two edges 37 and 38 respectively of the structural unit 11. Each of the mateable sections 35, 36 includes at least five alternating raised and recessed areas 40-44. The alternating raised areas 40, 42 and 44 and recessed areas 41 and 43 form an asymmetrical pattern along the length of each mateable section. The asymmetrical pattern is the same or a reverse thereof along each mateable section of the same unit and other units with which it is assembled.

As shown in FIG. 2, structural unit 11 has a mateable section along each of its four edges. Thus, mateable sections 35 and 36 of unit 11 include patterns 48 that extend outwardly beyond two edges of the face portion 26 while mateable sections 45 and 46 include reverse patterns 49 that are recessed below the other edges of the face portion.

This arrangement of the mateable sections 35, 36, 45 and 46 around the periphery of unit 11 enables the unit to be assembled with other units, each of which includes at least two of the same asymmetrical patterns along the mateable sections thereof. In FIGS. 2 and 3, unit 11 is joined with structural unit 12 by inserting exposed raised mateable section 35 into recessed mateable section 45 of unit 12. Since the mateable patterns are asymmetrical, the units can only be joined in an orientation which the building designer has selected in advance. In the same way, other units can be joined to units 11 and 12.

Since the units are molded within very close tolerances, joining the units through the mateable sections provides automatic alignment and orientation of one unit to the next. Thus, joining wall units 11, 12 with similar units provides a straight true wall assembly with a high level of strength and structural integrity.

FIG. 1 shows how other units 13-24 are joined together with units 11 and 12. Each interconnection is achieved through the same mechanism with mateable sections of one unit being inserted into mateable sections of another unit. Where a change in direction is required, the units will include mateable sections that are oriented perpendicular to the main plane of the particular unit as shown for floor units 13, ceiling units 14 and roof units 15. Also, wall units with perpendicular mateable sections facilitate the interconnection of perpendicular walls therewith.

Advantageously as shown in FIG. 8, the face portions 26 of the structural unit of the invention include high density skin sections 31, 32 preferably in a stressed state and the intermediate core section 33 is of a density less than the skin sections. The density of the core section advantageously decreases with increasing distance from the face portions. This decrease in density preferably is achieved when the core section includes a foam and most preferably a carbon dioxide foam. The face portions and the core section advantageously are integrally formed as a unitary structure. An especially desirable structural unit includes a thin high density central section 34 along the axis of a foamed core section.

As described above, the structural units of the present invention may be of a number of different configurations. Advantageously, for walls, floors, ceilings, roofs, etc., the face portions 26 of the units generally include substantially square or rectangular face portions to establish the desired modular design of the building. The corner units 16 include intersecting face portions. The thickness of the units may vary and preferably is substantially less than the largest dimension of the face portions.

To facilitate positive interlocking of adjoining units, it is advantageous to include at least one passage through the mateable sections. A passage 47 (FIGS. 2-4) may be through a raised area 40 of a pattern 48 extending from the core section 33 beyond the face portions 26 or alternatively through the face portions themselves when the mateable section includes a pattern 49 recessed into the intermediate core section. When the adjoining units are interconnected through the mateable sections, a continuous transverse passage 50 is created through the interconnected mateable sections 35 and 45.

Advantageously, a pin 51 is inserted through the open passage 50 to positively interlock the units as shown in FIGS. 3 and 4 with units 11 and 12. The pin 51 preferably is tapered from its leading point to exert a centering force on the assembled units and thus ensure precise alignment of adjoining units.

For precise alignment of assembled units, the depths of the recessed mateable sections 45, 46 below the face portion edges advantageously are slightly greater than the heights of the raised mateable sections 35, 36 enrageable therewith beyond the face portion edges. This relationship insures that the combined face portion edges of adjacent units will be in full contact and bear against each other.

Also, such a structural relationship preferably provides space for the placement of a compressible ribbon 52 between the mating patterns 48, 49 of the respective units. The use of such a ribbon not only provides a seal against air leakage, but also provides for safe flexural movement between the assembled units. As a result, forces such as earthquakes and the like that ordinarily would cause extensive damage or complete destruction of conventional buildings, can be absorbed safely by buildings of the invention.

Units also may be fabricated by molding mateable sections in the face portions intermediate the edges thereof. Two or more such units 56 and 57 are assembled as shown in FIG. 4 by placing them in a spaced parallel relationship with their ends aligned in perpendicular planes and the mateable sections 54 in the faces extending toward one another. Connecting sections 58 similar to unit 11 having mateable sections 60 in opposite ends thereof are interconnected with the facing mateable sections 54 in the faces 55.

Advantageously, at least two connecting sections are utilized in each double unit assembly 59 for structural integrity. It is preferred to have recessed mateable sections 60 on opposite ends of the connecting sections so pins 61 can be inserted through passages 62 and 63.

Another form of double unit assembly is shown in FIG. 7. Two units 64 and 65 are formed with a connecting section 66 or 67 respectively extending from face portions 68 of wall sections 69 and 70 that are similar to wall units 11 and 12 described above. Each connecting section has a face 72 or 73 that is perpendicular to the face portion 68 from which it extends.

When the units 64 and 65 are positioned with their respective surfaces 72 and 73 of connecting sections 66, 67 in face to face contact and overlapping and the surfaces adhered to each other, the two units form a double unit assembly 74. Assembly 74 is similar to double unit assembly 59 described above and could be used in similar applications. An advantage of unit assembly 74 is that the spacing between the wall sections 69 and 70 can be varied for different width structures.

Double units may be interconnected with the openings therein extending perpendicular to the length of the wall or following the length of the wall as desired. In foundations as shown in FIG. 1, the vertically arranged openings may be filled with concrete alone or with reinforcing rods, etc. Openings forming continuous passages through assembled units may serve as conduits for plumbing, electrical wiring, heating system ducts, etc. or simply be filled with insulation.

One form of continuous molding apparatus 81 of the present invention for molding the structural units 11–24 described above includes a raw material supplying portion 83, a molding portion 84, a supporting portion 85, a mixing portion 86 and a control portion 87 as shown in FIGS. 5, 6, 9 and 10 of the drawings.

The raw material supplying portion 83 of the molding apparatus 81 of the invention includes a plurality of reservoirs 90, 91, 92, 93, 94 and 95. These reservoirs may include storage chambers for resin-forming materials, fillers, reinforcements, colors, catalysts, foam-forming materials, other additives, inert mixtures thereof and the like. Reservoirs 94 and 95 are connected with reservoir 90 for premixing of inert materials therein prior to transfer to the mixing portion.

Reservoirs 90–93 of the raw material supplying portion 83 are independently connected to the mixing portion 86 through conduit means 96, 97, 98 and 99. Advantageously, separate bypass return conduit means 100 extend from one end of each conduit 96–99 adjacent the mixing portion 86 back to the respective reservoir 90–93 as illustrated in FIG. 6.

The molding portion 84 of the molding apparatus 11 includes a plurality of spaced mold assemblies 101, 102, 103, 104 and 105. Each of the mold assemblies includes at least two separable mold sections shown for mold assembly 101 as mold sections 107 and 108.

At least one of the mold sections 107 or 108 of each mold assembly 101–105 includes a plurality of rotatable mold surface elements shown in FIG. 9 as elements 110, 111 and 112. Each of the mold surface elements is rotatably supported substantially parallel to adjacent mold section surfaces 113.

Each surface element 110, 111 or 112 is spaced from the adjacent mold section surfaces 113 a distance equal to that between an axis 114 and an outer mold surface 115 of the respective element. Advantageously, the mold surface elements are arranged adjacent a peripheral end 117 of the mold sections. This arrangement positions the exposed mold surface segment close to the adjacent mold section surfaces 113 and thus provides a substantially continuous mold cavity without gaps.

A plurality of different mold surface segments shown as segments 118, 119 and 120 are arranged symmetrically around the axis 114 of each element. Segment 118 provides a projecting mateable section, segment 119 a recessed mateable section and segment 120 a flat blank. The elements preferably are retractable from the mold section surface 113 prior to rotation as indicated in FIG. 10.

The supporting portion 85 of the molding apparatus 81 preferably includes a plurality of frame sections 123, 124, 125 and 126 that are rotatable about separate axes 127–130 jointly rotatable about a common axis 131 as shown in FIG. 5. A plurality of support means 132 are spaced along the frame sections for independent rotation of each mold assembly about a second axis.

Advantageously, the mold assemblies are disposed on the supporting portion 85 generally parallel to one another with adjacent ends thereof in the same general transverse plane. The rotational capability of the mold assemblies preferably is about axes generally perpendicular to one another. The frame sections advantageously are rotatable about a horizontal axis.

The mixing portion 86 of the molding apparatus 81 preferably includes an elongated mixing chamber 133, 134, 135, 136 or 137 disposed adjacent each mold assembly. A plurality of deflector sections 138 and 139 are disposed within each mixing chamber and spaced along the length thereof. As shown in FIG. 5, mixing chambers 133-137 advantageously are located at the inlet 140 of each mold assembly 101-105. Preferably, the mixing chambers of the mixing portion are integrally formed with the mold assemblies as shown in FIGS. 9 and 10.

The deflector sections 138, 139 disposed within the mixing chambers 133-137 advantageously are angled with respect to a longitudinal axis of the respective mixing chambers. Preferably, the deflector sections are movable selectively to a position outside the mixing chamber (FIG. 10). It is advantageous that the mixing portion include cleaning means movable into the mixing chamber when the deflector sections are positioned outside it. Preferably, the cleaning means includes a piston member 142 that is inserted into the mixing chamber. For complex mold designs including one or more elongated and/or tortuous areas, it is desirable that the mold assemblies include more than one inlet for controllable delivery of the moldable mixture into different zones of the mold cavity.

The control portion 87 of the molding apparatus 11 of the present invention includes a plurality of pumps, valves, sensors, monitors and the like. Advantageously, a pump 143, a valve 144 and a flow monitor 145 are located along the length of each conduit 96-99 that extends between the raw material reservoirs 90-93 and the mixing chambers 133-137.

Also, the control portion includes a plurality of drive means. Drives 146, 147 provide rotation of each mold assembly 101-105 about two axes. Drive 148 provides rotation and orientation of the mold surface elements 110, 111 and 112. Drive 149 provides separation of the mold sections 107 and 108.

The control portion 87 further includes programmable memory means 151 and actuating means 152 responsive thereto, advantageously in combination with coordinating means 153, to control the operation of the pumps, valves and drives. The control portion preferably includes means 154 in the mold assemblies monitoring the flow distribution within the mold cavities.

Advantageously, the coordinating means 153 includes a process controller 155 that initiates changes in the flows of materials and speeds of drives to bring variations therein back to the rates specified in the programs present in the memory 151. This coordination commonly is achieved through the transmission of information such as digital pulses from the monitors and/or sensors at the control components to the process controller. The operating information is compared with the preselected programming parameters stored in the memory. If differences are detected, instructions from the controller change the operation of the components to restore the molding operation to the preselected processing specifications.

Novel molded structural units of the present invention may be formed using the molding apparatus 81 shown in the drawings employing the following steps of the molding method of the invention. With the design of the desired unit and the location of the mateable sections thereof established, the control portion 87 including memory 151 which may be a computer, is programmed with the necessary processing parameters for the particular product being molded.

The molding portion 84 is prepared to provide a mold cavity with the desired configuration. Advantageously, the control portion 87 forms a mold cavity with the desired positioning of the mateable sections in the unit being molded by activating drive 148 to retract one or more of the mold surface elements 110-112 as shown in FIG. 10. The elements then are rotated about axes 114 to position the desired mold surface segment 118-120 for exposure during the molding operation.

Thus, the structural unit that is being molded will have the mateable sections thereof in the desired orientation. In this way, a mold cavity configuration is created simply and quickly without removing the mold sections or mold assembly from the molding apparatus 81 so downtime is greatly reduced.

To start the operation of the molding apparatus 81, buttons and/or switches 156 of a control panel 157 are depressed to activate the memory 151 and the other components of the control portion 87. The coordinating means 155 energizes drive 149 to lock the mold sections together and the drive 147 for rotation of each mold assembly 101-105.

Also, the pumps 143, the valves 144 and the flow monitors 145 are energized by the coordinating means 153 in the preselected sequences of the program stored in the memory. This causes the raw materials in reservoirs 90-93 to advance along the conduits 96-99 toward the mixing portion 86. For example, to mold a product including a foamed polyurethane resin, reservoir 90 may contain a previously prepared mixture of an isocyanate and gravel as a filler, reservoir 91 a polyol, 92 foam forming materials and 93 and other reservoirs—colors, catalysts, etc. as required.

For the production of high quality molded structural units of the invention, it is important that the raw materials delivered to the mixing chambers 133-137 be uniform in volume and composition. This can be facilitated by providing a continuous flow of raw materials to the mixing portion 86 and the immediate transfer of the mixture therefrom into the mold cavities. However, the volume of the mixture delivered into the mold cavities will vary depending upon the particular incremental area of the cavity being coated at any instant. Also, the delivery will be terminated completely when a molded product is being removed from the mold assembly.

Advantageously, as shown in FIG. 6, a separate bypass conduit 100 is utilized from the end of each conduit 96-99 at a point adjacent each mixing chamber 133-137 back to the respective reservoir 90-93. This construction provides a freshly formed uniform mixture into the mold cavities even though the distance is considerable between the reservoirs and the individual mixing chambers which are located closely adjacent or even within the mold assemblies.

The control portion 87 coordinates the operation of the various system components so the required formulation can flow into the desired zones within the rotating mold cavity. With the molding apparatus 81 as shown in FIG. 5, the formulation is introduced into the mold cavity while the axis of the mold assembly is in the orientation shown, that is, radial of the central horizontal axis of the apparatus.

When the desired volume of the mixture has passed into the mold cavity, the deflector sections 138 and 139 are withdrawn from the mixing chamber. Then, the piston member 142 moves forward into the mixing chamber pushing any liquid mixture remaining therein into the mold cavity and cleaning the mixing chamber for the molding of the next product. With the piston 142 disposed in the mixing chamber, rotation of the frame sections 123-126 is begun while continuing the rotation about the transverse axis to flow the mixture over all surfaces of the mold cavity.

The rotations are controlled within the parameters stored in the memory 151. For particular structural units, the rotations about the respective axes may be continuous and/or intermittent at changing rates. Also, it may be desirable to provide arcuate rotation, that is, movement about an arc such as a rocking motion. Advantageously, monitors 154 within the mold assemblies inform the process controller when the mixture has flowed over all surfaces of the mold cavity.

The components of the liquid mixture that flows over the mold interior quickly begin to react to form the thermosetting resin structure while rotational movement of the mold assembly continues. The mixture initially spread over the mold interior forms a resin coating with a high density with little or no bubble formation. As the reaction rate increases due to the exothermic reaction of the resin formation, the foam formed decreases in density.

The foam density decreases substantially uniformly as the spacing from the mold cavity surfaces increases. This decrease in density continues until the foams that are expanding toward each other meet. At these boundaries, a thin high density central barrier is formed.

The rotation of the mold assembly is stopped and the mold sections 107 and 108 separated to free the molded unit therefrom. The separated molded structural unit is set aside to complete the foam formation and/or the curing of the resin therein. During this period, the final expansion of the foam, free of the mold's restraint, stresses the high density outer skin or layer of the product. This stressing of the skin increases the strength and puncture resistance thereof and also the structural strength of the molded product itself. The structural strength of the product can be enhanced further by including a reinforcement such as metal or fiberglass fibers in the mixture prior to molding. Also, preformed reinforcements such as metal rods can be positioned in the mold cavity before the mold sections are closed.

FIG. 8 illustrates an enlarged cross-sectional view of a structural unit of the invention produced employing the molding apparatus and method described above. As shown, the unit includes high density stressed outer skin sections 31 and 32 with less dense layers 33 extending inwardly therefrom to a thin high density central barrier 34. Filler particles 160, fiber reinforcements 161 and rods 162 are distributed throughout the product. Resin matrix 163 surrounds gas bubbles 164, individual filler particles, fiber reinforcements and preformed reinforcements.

The above description and the accompanying drawings show that the present invention provides a novel structural unit and a molding apparatus and method for molding the units which not only overcome the deficiencies and shortcomings of earlier expedients, but also provide features and advantages not found in previous products. The structural unit of the invention has superior strength and other physical properties. The unit is of high quality and uniformity of dimensions and composition.

Structural units of the invention can be assembled to form buildings of many different designs easily and conveniently without special skills or tools by one person or a small crew. The novel interlocking means and the dimensional uniformity of the structural units permits them to be assembled precisely and accurately without mortar and without having to check alignment as each unit is added. Buildings can be modified or dismantled and reassembled if desired.

Variations in structure and composition of the units can be made with the apparatus and method of the invention simply and quickly without sacrificing quality and dimensional uniformity.

It will be apparent that various modifications can be made in the particular structural unit and the apparatus and method of molding same described in detail above and shown in the drawings within the scope of the present invention. The size and configuration of the units can be changed to meet specific requirements. Also, the number and quantities of constituents in the moldable mixture can be different. In addition, other mateable section pattern configurations can be utilized. If desired, decorative designs can be incorporated into the face portions during molding.

These and other changes can be made in the structural unit, the apparatus and method of molding provided the function and operation thereof are not adversely affected. Therefore, the scope of the present invention is to be limited only by the following claims.

What is claimed is:

1. An insulated molded plastic structural unit including spaced face portions, an intermediate portion and interlocking portions; said face portions each including an integrally formed stressed hard outer skin section, said intermediate portion including an insulating core section; said interlocking portions including mateable sections along at least two edges of said unit, each of said mateable sections including at least five alternating raised and recessed areas forming an asymmetrical pattern along the length of each mateable section, the pattern being the same or a reverse pattern thereof along each mateable section of the same unit and of adjacent units to which it will be joined, said mateable sections extending beyond said face portions or being recessed below said face portions on said edges of said unit a substantially equal distance; whereby adjacent units are interconnected by engaging a recessed mateable section of one unit with a raised mateable section of an adjacent unit or vice versa.

2. An insulated molded plastic structural unit according to claim 1 wherein said face portions are substantially parallel and include high density skin sections and said intermediate core section is of a density less than said skin sections.

3. An insulated molded plastic structural unit according to claim 2 wherein said core section decreases in density with increasing distance from said face portions.

4. An insulated molded plastic structural unit according to claim 1 wherein said face portions and said core section are integrally formed as a unitary structure.

5. An insulated molded plastic structural unit according to claim 1 wherein said mateable sections extend from or are recessed into said core section.

6. An insulated molded plastic structural unit according to claim 1 wherein said core section includes a foam.

7. An insulated molded plastic structural unit according to claim 5 wherein said core section includes a carbon dioxide foam.

8. An insulated molded plastic structural unit according to claim 1 wherein said core section includes a high density section along the axis thereof.

9. An insulated molded plastic structural unit according to claim 1 wherein said skin sections are in a stressed state.

10. An insulated molded plastic structural unit according to claim 1 wherein said structural unit includes a particulate filler.

11. An insulated molded plastic structural unit according to claim 10 wherein said particulate filler comprises a major proportion of said structural unit.

12. An insulated molded plastic structural unit according to claim 10 wherein said particulate filler is a mineral material.

13. An insulated molded plastic structural unit according to claim 10 wherein said particulate filler is a granular mineral material.

14. An insulated molded plastic structural unit according to claim 10 wherein said particulate filler is substantially uniformly distributed throughout said unit.

15. An insulated molded plastic structural unit according to claim 1 wherein said structural unit includes a thermosetting resin.

16. An insulated molded plastic structural unit according to claim 1 wherein said structural unit includes a reinforcing material.

17. An insulated molded plastic structural unit according to claim 1 wherein said structural unit includes a preformed reinforcement.

18. An insulated molded plastic structural unit according to claim 1 wherein said unit includes substantially square face portions.

19. An insulated molded plastic structural unit according to claim 1 wherein said unit includes substantially rectangular face portions.

20. An insulated molded plastic structural unit according to claim 1 wherein said unit is a corner unit including intersecting face portions.

21. An insulated molded plastic structural unit according to claim 1 wherein the thickness of said unit is substantially less than the largest dimension of said face portions.

22. An insulated molded plastic structural unit according to claim 1 wherein said mateable sections include at least one transverse passage therethrough.

23. An insulated molded plastic structural unit according to claim 22 wherein said face portions include at least one passage therethrough alignable with said passage through said mateable section.

24. An assembly of the structural units of claim 1 wherein said units are joined along said mateable sections with an outwardly extending mateable section pattern of one unit engaging a corresponding recessed mateable section pattern of an adjacent unit.

25. An assembly of the structural units of claim 24 including pins extending through said mating patterns of adjacent units fixing the alignment thereof.

26. An assembly of the structural units of claim 25 wherein said pins taper from one end thereof to another.

27. An assembly of the structural units of claim 24 wherein a compressible ribbon is disposed between mating patterns of adjacent units.

28. An assembly of the structural units of claim 1 wherein a pair of said structural units are disposed substantially parallel to one another with at least two connecting sections joining adjacent face portions of said units.

29. An assembly of the structural units of claim 28 wherein each connecting section is affixed only to one unit with pairs thereof overlapping for adjustability of the spacing between said parallel units.

30. Continuous molding apparatus including a raw material supplying portion, a mixing portion, a molding portion and a control portion; said molding portion including at least one rotatable mold assembly, said mold assembly including at least two separable mold sections, at least one of said mold sections including a plurality of rotatable mold surface elements, each of said mold surface elements being rotatably supported substantially parallel to adjacent mold section surfaces and spaced therefrom a distance equal to that between an axis and an outer surface thereof, a plurality of different mold surface segments arranged symmetrically around said axis; said control portion including pump means, valve means and flow monitoring means for said raw material supplying portion, independent drive means for rotation of said mold assembly, separation of said mold sections and retraction and rotation of said mold surface elements; programmable memory means and actuating means responsive thereto respectively controlling and activating said pump means, said valve means and said drive means.

31. Continuous molding apparatus according to claim 30 wherein said mold surface elements are arranged adjacent a peripheral edge of said mold sections.

32. Continuous molding apparatus according to claim 30 wherein said mold surface elements are retractable from said mold section surface prior to rotation.

* * * * *